Oct. 5, 1943.   C. S. ASH   2,331,159
DUAL WHEEL BRAKE
Filed Jan. 28, 1942   3 Sheets-Sheet 1

Fig. 1

INVENTOR
CHARLES S. ASH
BY
ATTORNEY

Oct. 5, 1943.   C. S. ASH   2,331,159
DUAL WHEEL BRAKE
Filed Jan. 28, 1942   3 Sheets-Sheet 2

INVENTOR:
Charles S. Ash
BY
ATTORNEY

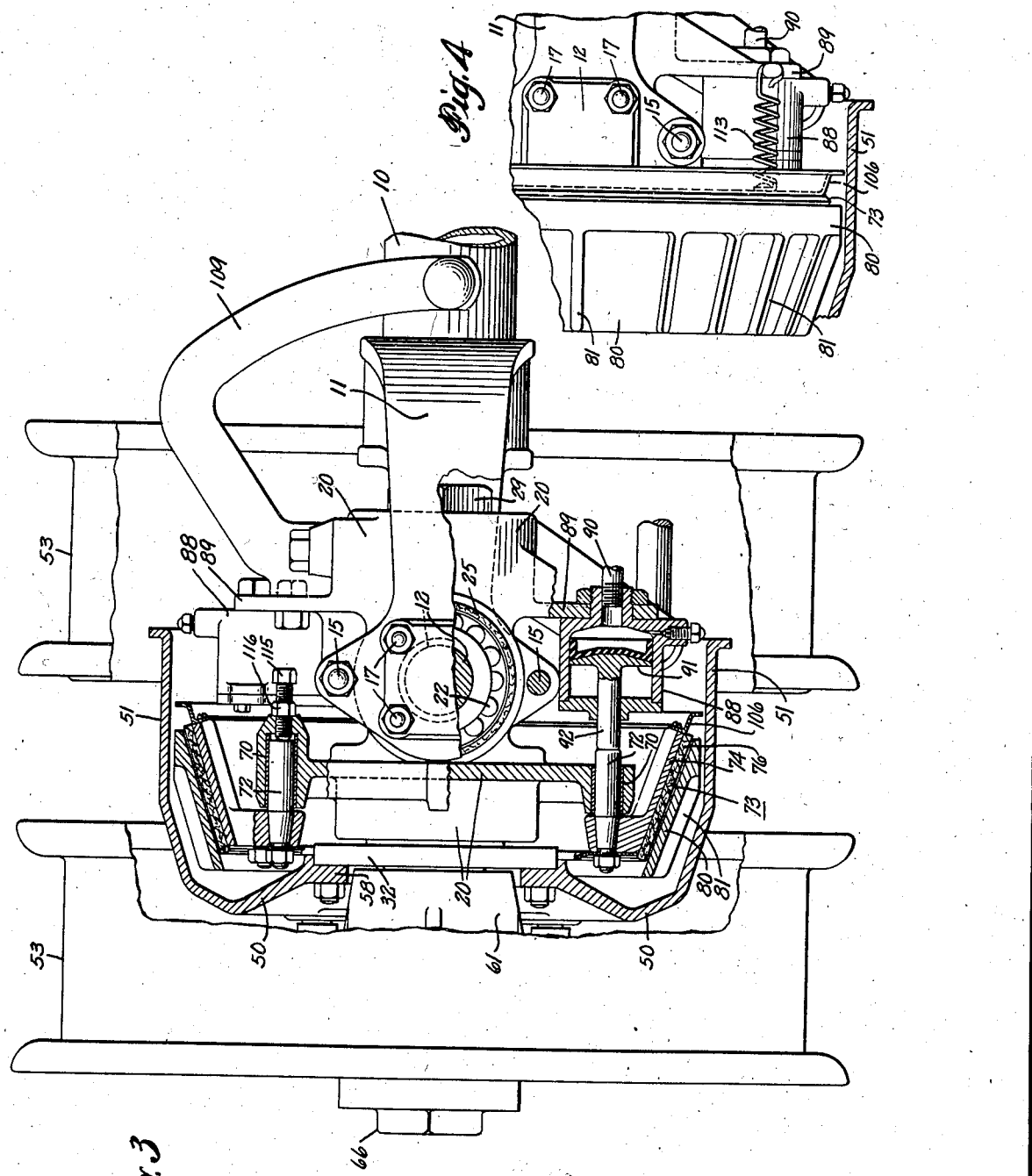

Patented Oct. 5, 1943

2,331,159

UNITED STATES PATENT OFFICE 2,331,159

DUAL WHEEL BRAKE

Charles S. Ash, Milford, Mich.

Application January 28, 1942, Serial No. 428,540

18 Claims. (Cl. 188—18)

The present invention has for its object the provision of novel and improved dual wheel brake for automotive vehicles, and more particularly novel and improved brake for independently rotatable dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a vertical sectional view showing a typical and illustrative embodiment of the present invention as applied to dirigible dual wheels which are independently rotatable;

Figure 3 is a sectional view taken on the line 3—3 of Figure 2; and

Figure 4 is a fragmentary detail view of a portion of the inner wheel brake, the outer wheel brake being broken away.

Figure 2:
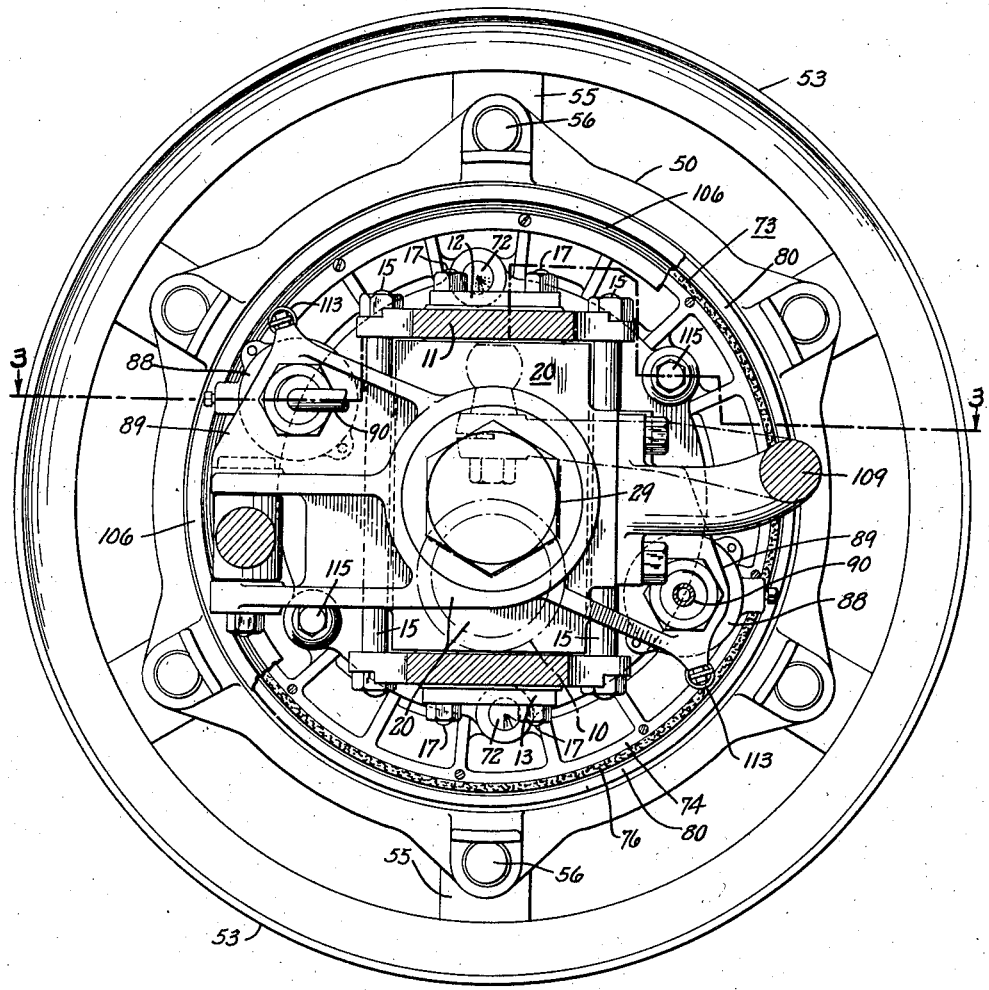
Figure 2 is a sectional view taken on the line 2—2 of Figure 1.

The present invention has for its object the provision of a novel and improved brake construction particularly adapted for use with dirigible, independently rotatable dual wheels adapted to carry heavy loads. Another object of the invention is the provision of a dirigible dual wheel brake which is compact, is of relatively small diameter, and provides adequate brake surface for very heavy loads. Still another object of the invention is the provision of an improved brake for dual wheel vehicles in which separate brakes for the dual wheels are adapted to be simultaneously energized from a common actuator and in which the separate brakes do not interfere with independent rotation of the wheels while they are being braked.

In accordance with a typical embodiment of the invention, illustrated as applied to the braking of dirigible dual wheels, such a pair of side-by-side, relatively rotatable, dirigible, dual wheels which have free independent rotation as used at the front of an automotive vehicle. One of the dual wheels is mounted for rotation by an inwardly projecting spindle portion which is journaled in spaced apart bearings, one on either side of the vertical axis about which the wheels are to be dirigibly moved, the bearings being mounted at an end of the axle, while the outer wheel is rotatably journaled on an outer portion of the spindle. The wheel structure described and shown in this application is more fully described, and is claimed, in my copending application Serial Number 428,539.

The braking means of the present invention provided for retarding or illustratively comprise a tapered or frusto conical brake member is mounted on each of the wheels and cooperates with suitable correspondingly shaped braking means which may be axially moved for actuation in any desired manner. To give the maximum braking area consistent with the proper spacing of the brakes from the tire rims, the braking members are each elongated and of relatively small diameter and are actuated by axial movement of members of each pair relatively to the other.

As embodied, actuation of the braking means for one of the wheels causes a simultaneous brake actuation of the other wheel brake from a common source of power. Suitable means are provided for properly proportioning the braking effort between the wheels, insuring adequate braking of both wheels, at the same time not interfering with the continued relative rotation of the wheels even when the brakes are applied with a considerable degree of force.

When used on dirigible wheels, the actuator means and one of the brake shoes are mounted to turn with the steering movement of the wheels and the actuator means are preferably mounted in front and to the rear of the axle end, thereby decreasing the turning radius of the vehicle.

It will be understood that the foregoing general description and the following detailed description as well are exemplary and explanatory of the invention but are not restrictive thereof.

Referring now in detail to the accompanying drawings illustrating the preferred embodiment of the invention, as applied to dual wheels, such as the dirigible front wheels of a heavy-duty truck or tractor mounted on a front axle 10 of conventional form at each end of which is provided a yoke 11. Seated in the ends of the yoke 11 and extending in axial alinement are king pin bearing studs 12 and 13, removably secured to the yoke by means of the tie bolts 15 and the smaller bolts 17.

Dirigibly mounted by means of the pins 12 and 13 is a combined bearing sleeve and brake anchor which comprises a hollow member 20 provided with bearing seats to receive the tapered roller bearing 22 and 23 by which the member is dirigibly mounted on the king pin studs 12 and 13. Lubricant retaining washers 25 are also provided for retaining lubricant within and excluding dust from the bearings 22 and 23.

Sleeve member 20 is also provided with bearing seats in horizontal alinement near each of its ends to receive the wheel spindle tapered roller bearings 26 and 27, and at its inner end it is threaded to retain the bearing cap 29, while the outer end of the sleeve is closed by means of the lubricant retaining washer 28.

The wheel spindle comprises a relatively long spindle 30 having an intermediate flange 32 to which the inner wheel is bolted, and an inwardly projecting axial portion which is finished to provide seats for the inner races of bearings 26 and 27, while its inner end is threaded to receive the castellated nut 34 and bearing washer 35, by which the spindle is held against axial movement with respect to its bearings.

As illustrated, one of the bearings, 27, is positioned inwardly of the king pins 12, 13, while the other bearing 26 is positioned at the outer side of these king pins, thereby spacing the bearings 26, 27 apart and minimizing the radial loading of the bearings as the vehicle is driven over rough terrain or roads.

The spindle 30 also projects outwardly of the flange 32 to provide a portion 37 on which the outer wheel is rotatably mounted. Spindle portion 37 is formed with spaced apart bearing seats 39 and 40 on which are received the tapered roller bearings 41 and 42 by which the outer wheel is mounted for rotation, and these bearings are held against axial movement by means of the bearing washer 44 and castellated nut 45.

The inner wheel illustratively comprises a radially extending web portion 50 which is integral with a cylindrical drum 51, outwardly flanged at its inner end and provided with means for attaching a pneumatic tire rim 53 thereby, as by the lugs 55 and the bolts 56. The drum portion 51 of the wheel may be ribbed, as at 57, to increase its strength, and the radially innermost portion is provided with a flange 58 to fit over the intermediate flange 32 and is mounted securely thereon by means of the bolts 59.

The outer wheel illustratively comprises a hub portion 61 to which is integrally formed an intermediate or web portion 62 which is provided around its periphery with a plurality of rim mounting seats 63 to which the rim lugs 55 of the outer tire rim may be bolted by bolts 56, the inner and outer rims 53 preferably being duplicates of each other. The interior of the hub is formed with bearing seats in which the outer races of bearings 41 and 42 are received, the inner end of the hub is provided with a lubricant retaining washer 65, while the outer end of the hub is closed by means of the threaded hub cap 66, so that lubricant may be retained around the bearings 41 and 42.

While various other forms of dual wheels having independent rotation may optionally be used with the brakes of my present invention, the dirigible wheels are preferably of the form and construction shown and the inner wheel is preferably deeply dished to provide space for the brake mechanism as well as the king pin.

The brake shoe 73 comprises a frusto-conical member 74, the outer face of which is covered with a continuous moulded brake lining 76, while the smaller, outer end of the member 74 extends inwardly and is apertured to be bolted to the tapered ends of the guide rods 72. The sleeve like spindle supporting member 20 is provided at its outer end with a radially extending brake anchor portion which clears the upper and bottom ends of the yoke 11. A plurality of parallel, axially extending apertures 70 are formed in the brake anchor portion, preferably at a uniform distance from the axis of the spindle and are bushed to receive the plurality of guide rods 72 by which the brake shoe 73 is supported and mounted for axial movement, thereby permitting only axial movement of the brake shoe 73.

The brake drum for the inner wheel comprises a correspondingly tapered frusto-conical member 80 having a continuous finished inner surface and provided on its exterior with strengthening ribs 81, as well as with sockets 82 in which are received the axially extending, evenly spaced guide rods 84 which are slidable in the bushed apertures 85 formed in the web portion 50 of the inner wheel. The brake drum 80 may thus move towards the wheel web 50 but is always maintained coaxial with the brake shoe 73 and a full contact is obtained between the brake shoe and drum when the two are moved relatively towards each other.

Means are provided for actuating the brake and comprises a plurality of hydraulic cylinders 88 which are separately mounted on radially extending portions 89 of the sleeve and brake anchor and each of which is in communication with its hydraulic line 90 supplied with brake operating fluid from a common source. Within each cylinder 88 is a piston 91 connected to the piston rod 92 which bears against the inner end of a guide rod 72 so that application of hydraulic pressure to the piston 91 forces the brake shoes 73 axially outwards to engage it with the brake drum 80. The plurality of hydraulic cylinders provided are preferably arranged symmetrically so as to distribute the braking pressure uniformly.

Means are also provided for transferring the braking pressure to the outer wheel and for braking the outer wheel. As embodied, the outer wheel brake comprises a frusto-conical brake drum 95 mounted at and by the outer ends of the guide rods 84 so that it is coaxial with the outer wheel 62. Brake drum 95 is adapted to contact with and frictionally engage the complementary brake shoe formed by the brake lining 97 mounted on the frusto-conical portion 98 of the outer wheel web 62. The outer brake drum 95 and shoe are forced into contact with each other by the hydraulic pistons 91, transmitted through the inner brake shoe 73, the inner brake drum 80, and the guide rods 84 to the outer brake drum 95.

By varying the relative area of the inner and outer wheel brakes, by varying the taper of the inner and outer brake shoes and drums and by varying the materials of which these parts are made, the relative degree of braking applied to the two dual wheels may be predetermined, but they are preferably so designed, and are so shown that an equal braking force is applied to each of the two wheels. That is, the inner brake has twice the braking effort of the outer brake inasmuch as the inner brake resists not only the rotation of the inner wheel but also the rotation of the outer wheel as transmitted to the inner brake by the outer wheel means.

For keeping excessive dust and other foreign matter from the brakes, the outer brake drum is provided with dust washers 100, 101 which are carried in grooves in the brake drum and slide on cylindrical surfaces 102, 103 on the inner face of the outer wheel. The inner wheel brake is similarly guarded against dust by means of the dust plate 105 carried by the guide rods 74 and the dust plate 106 mounted on the brake anchor plate 20.

For dirigibly moving the dual wheels about their king pins 12 and 13, a steering arm 109 is bolted to the sleeve member 20 and may be connected to the tie rod or pitman in the usual manner.

Means are provided for disengaging the brake drum 80 from its brake shoe 73, and for this purpose springs move the brake drum 80 until the brake drum 95 is lightly in contact with its brake shoe 98. These springs comprise a plurality of coil springs 108 each mounted in a recess 110 formed in the brake drum 95 and in an alined recess 111 in the wheel web 50 the several recesses being symmetrically spaced. Other means are provided for retracting the brake shoe 73 when the hydraulic pressure on piston 91 is relieved and comprise a plurality of symmetrically spaced tension springs 113, each having one end connected to the brake shoe 73 and its other end connected to the brake anchor plate 20 inwardly of the wheels.

Adjustable stop means limit the inward movement of the brake shoe 73 and comprise a plurality of set screws 115 each threaded into one of the bushed apertures 70 and held against accidental movement by means of the jamb nuts 116.

In the operation of the embodiment illustrated in Figures 1 to 4, the inner wheel 50 is rotatably journaled with respect to the axle 10 and has dirigible movement by virtue of the king pin bearings 22, 23 which tend to hold the spindle in a substantially horizontal position. The outer wheel 62 is mounted for coaxial relative rotation, and the wheels have free independent rotation, each on its own bearings of relatively small diameter and by which they are held in coaxial relation with a fixed axial spacing.

Due to the smaller diameter of the bearings, greater clearance is afforded with respect to the front axle and a shorter turning radius may be had than has heretofore been the case. Furthermore, the brake structure may be mounted outwardly of the king pin mounting, so as to further increase the sharpness with which the wheels may be steered.

Normally, the brake members 95 and 97 are in light contact with each other, while the brake members 73 and 80 are out of contact with each other. Thereby, no hindrance is offered to the conjoint rotation of the wheels, minimizing brake wear, and only a minimum of resistance is offered to the relative rotation of the wheels, which causes only negligible wear due to the relatively small amount of such relative rotation.

When pressure is applied to the hydraulic cylinders 88, the pistons 91 are moved outwardly pressing the brake shoe 73 into engagement with the brake drum 80 and simultaneously pressing the brake drum 95 against the brake lining 97 with an equal pressure, thereby applying an equal braking effort to both wheels and retarding both wheels, while at the same time permitting independent or relative rotation. The brake 73, 80 retards rotation of the inner wheel and also retards rotation of the outer brake drum 95 thereby retarding rotation of both wheels, while the brake 95, 97 retards rotation of the outer wheel.

As the hydraulic pressure is relieved, springs 113 disengage the brake members 73, 80 moving the guide rods 72 against their stops 115, and at the same time relieving the powerful pressure of the brake drum 95 against its brake lining 97, thereby once again permitting free rotation of both wheels.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel brake for coaxial, independently rotatable wheels including in combination two pairs of frusto-conical brake members, one operative on the outer wheel, the other on the inner wheel and means for axially moving said brake members relatively to each other, the brake members for the outer wheel being supported in part by the outer wheel and in part by the inner wheel.

2. A dual wheel brake for coaxial, independently rotatable wheels including in combination a brake member of conical form carried by the outer wheel, a second brake member of corresponding shape carried by the inner wheel and engageable with the first member, a third conical brake member carried by the inner wheel and an anchored brake member of corresponding shape engageable therewith.

3. A dual wheel brake for coaxial, independently rotatable wheels including in combination a brake member of conical form carried by the outer wheel, a second brake member of corresponding shape carried by the inner wheel and axially movable to engage the first member, a third conical brake member carried by the inner wheel and an anchored brake member of corresponding shape movable axially into engagement with the third brake member.

4. A dual wheel brake for coaxial, independently rotatable wheels, including in combination a brake member of conical form carried by the outer wheel, a second brake member of corresponding shape carried by the inner wheel and axially movable to engage the first member, a third conical brake member carried by the inner wheel and an anchored brake member of corresponding shape movable axially into engagement with the third brake member, said second and third brake members being connected for joint axial movement on axial movement of the anchored brake member.

5. In a braked dual wheel assembly having coaxial, side by side, independently rotatable wheels, the combination of a fixed support in which the wheels are rotatably mounted, a brake member axially movable in the support and carried by a plurality of parallel guide rods, brake actuating means carried by the support and operating on the guide rods for axially moving the brake member and a cooperating brake member carried by one of the wheels.

6. In a braked dual wheel assembly having coaxial, side by side, independently rotatable wheels, the combination of a fixed support in which the wheels are rotatably mounted, a brake member, a plurality of slidable guide members by which the brake member is mounted on the support for relative axial movement, a pair of brake members between the wheels and one carried by each wheel, a brake member adjacent the support, carried by the wheel adjacent the support and connected to one of said pair of brake members for axial movement relatively to the wheel and brake actuating means carried by the support and operative to move the brake members relative to each other.

7. In a braked dual wheel assembly having coaxial, side by side independently rotatable wheels, the combination of a non-rotatable support in which the wheels are rotatably mounted, a pair of frusto-conical brake members for each wheel, said brake members being of substantially the same diameters and of different areas of mutual contact whereby the relative friction of the pairs is predetermined.

8. In a braked dual wheel assembly having coaxial, side by side independently rotatable wheels, the combination of a non-rotatable support in which the wheels are rotatably mounted and a pair of frusto-conical brake members for each wheel, one pair on either side of the inner wheel, one brake member being fast to the outer wheel and another fast to the support and means for relatively axially moving the brake members of each pair.

9. In a braked dual wheel assembly having coaxial, side by side independently rotatable wheels, the combination of a non-rotatable support in which the wheels are rotatably mounted, a brake member fixed to the inner side of the outer wheel, a brake member fixed to the support, a pair of brake members one on either side of the inner wheel, fixedly spaced and movable axially of the inner wheel and means for axially moving the innermost brake member on its support to engage all of the brake members.

10. In a braked dual wheel assembly having coaxial, side by side independently rotatable wheels, the combination of a non-rotatable support in which the wheels are rotatably mounted, a brake member fixed to the inner side of the outer wheel, a brake member fixed to the support, a pair of brake members one on either side of the inner wheel, fixedly spaced and movable axially of the inner wheel and means for axially moving the innermost brake member on its support to engage all of the brake members, all of said brake members being frusto-conical.

11. In a braked dual wheel assembly having coaxial, side by side independently rotatable wheels, the combination of a non-rotatable support in which the wheels are rotatably mounted, a brake member fixed to the inner side of the outer wheel, a brake member fixed to the support, a pair of brake members one on either side of the inner wheel, fixedly spaced and movable axially of the inner wheel and means for axially moving the innermost brake member on its support to engage all of the brake members, all of said brake members being frusto-conical and of the same diameter, but the pairs of cooperating brake members being of different tapers and axial length.

12. In a brake dual wheel assembly having coaxial, side by side independently rotatable wheels, the combination of a non-rotatable support in which the wheels are rotatably mounted, a brake member fixed to the inner side of the outer wheel, a brake member fixed to the support, a pair of brake members one on either side of the inner wheel, fixedly spaced and movable axially of the inner wheel and means for axially moving the innermost brake member on its support to engage all of the brake members, all of said brake members being frusto-conical and of the same diameter, and means for normally holding the outer pair of brake members lightly in contact with each other.

13. In a braked dual wheel assembly, a wheel having a pair of frusto-conical brake members mounted thereon, on opposite sides of the wheel, and axially movable relatively to the wheel.

14. In a braked dual wheel assembly, a wheel, a pair of frusto-conical brake members mounted thereon coaxial with the wheel, one on either side of said wheel, means for axially spacing the brake members and for mounting said brake members on the wheel for axial movement relative thereto.

15. In a braked dual wheel assembly, a wheel having a pair of frusto-conical brake members on opposite sides of the wheel, and means for mounting said brake members on the wheel including axially movable parallel guide rods held against rotation relatively to the wheel and connected at their ends to the brake members.

16. In a braked dual wheel assembly, a wheel having a pair of frusto-conical brake members on opposite sides of the wheel, and axially movable mounting means held against rotation relatively to the wheel for mounting the brake members on the wheel.

17. In a braked wheel assembly, a wheel having a pair of frusto-conical brake members on opposite sides of the wheel, means for mounting the brake members on the wheel said mounting means holding the brake members against substantial rotational movement relatively to the wheel while permitting axial movement thereof, said brake members being of different areas.

18. In a braked wheel assembly, a wheel having a pair of frusto-conical brake members on opposite sides of the wheel, means for mounting the brake members on the wheel said mounting means holding the brake members against substantial rotational movement relatively to the wheel while permitting axial movement thereof, said brake members being of different taper.

CHARLES S. ASH.